(12) United States Patent
Roderick et al.

(10) Patent No.: US 11,040,311 B2
(45) Date of Patent: Jun. 22, 2021

(54) INTERFERENCE PATTERNS FOR SPIRAL WOUND ELEMENTS

(71) Applicant: Aqua Membranes LLC, Albuquerque, NM (US)

(72) Inventors: Kevin Roderick, Albuquerque, NM (US); Rodney Herrington, Albuquerque, NM (US); Kendall Weingardt, Albuquerque, NM (US)

(73) Assignee: Aqua Membranes Inc., Albuquerque, NM (US)

( * ) Notice: Subject to any disclaimer, the term of this patent is extended or adjusted under 35 U.S.C. 154(b) by 253 days.

(21) Appl. No.: 16/071,567

(22) PCT Filed: Nov. 17, 2017

(86) PCT No.: PCT/US2017/062424
§ 371 (c)(1),
(2) Date: Jul. 20, 2018

(87) PCT Pub. No.: WO2018/094287
PCT Pub. Date: May 24, 2018

(65) Prior Publication Data
US 2019/0030488 A1 Jan. 31, 2019

Related U.S. Application Data

(60) Provisional application No. 62/424,460, filed on Nov. 19, 2016.

(51) Int. Cl.
*B01D 63/10* (2006.01)
*B32B 7/14* (2006.01)
*B01D 65/08* (2006.01)
*B32B 3/30* (2006.01)
*B32B 7/12* (2006.01)
(Continued)

(52) U.S. Cl.
CPC .......... *B01D 63/103* (2013.01); *B01D 63/10* (2013.01); *B01D 63/106* (2013.01); *B01D 65/08* (2013.01); *B32B 3/30* (2013.01); *B32B 7/12* (2013.01); *B32B 7/14* (2013.01); *B32B 37/12* (2013.01); *B32B 37/18* (2013.01); *B01D 2313/08* (2013.01); *B01D 2313/143* (2013.01); *B32B 2307/726* (2013.01)

(58) Field of Classification Search
None
See application file for complete search history.

(56) References Cited

U.S. PATENT DOCUMENTS

| 3,963,621 A | 6/1976 | Newman |
| 4,187,173 A | 2/1980 | Keefer |
| 4,208,289 A | 6/1980 | Bray |

(Continued)

FOREIGN PATENT DOCUMENTS

| CA | 2662925 A1 | 1/2009 |
| CA | 2825674 C | 8/2011 |

(Continued)

*Primary Examiner* — Krishnan S Menon
(74) *Attorney, Agent, or Firm* — V Gerald Grafe

(57) ABSTRACT

Embodiments of the present invention provide for the deposition of spacing elements on both opposing surfaces of either an entire folded membrane sheet or portions thereof in combination with features deposited on portions of the same sheet to create spacing geometries not otherwise achievable.

4 Claims, 6 Drawing Sheets

(51) Int. Cl.
  *B32B 37/12* (2006.01)
  *B32B 37/18* (2006.01)

(56) References Cited

U.S. PATENT DOCUMENTS

| | | |
|---|---|---|
| 4,222,874 A | 9/1980 | Connelly |
| 4,228,014 A | 10/1980 | Timm et al. |
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A * | 7/1988 | Wilson .......... B01D 53/22 210/321.83 |
| 4,775,465 A | 10/1988 | Burrows |
| 4,781,831 A | 11/1988 | Goldsmith |
| 4,784,771 A | 11/1988 | Wathen et al. |
| 4,802,982 A | 2/1989 | Lien |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,842,725 A | 6/1989 | Blad et al. |
| 4,842,736 A | 6/1989 | Bray |
| 4,844,805 A | 7/1989 | Solomon |
| 4,855,058 A | 8/1989 | Holland et al. |
| 4,856,559 A | 8/1989 | Lipshultz et al. |
| 4,869,821 A | 9/1989 | Korin |
| 4,874,514 A | 10/1989 | Casey Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,104,532 A | 4/1992 | Thompson et al. |
| 5,108,604 A | 4/1992 | Robbins |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 | 8/2001 | Kihara et al. |
| 6,299,766 B1 | 10/2001 | Permar |
| 6,345,961 B1 | 2/2002 | Oklejas, Jr. |
| 6,348,148 B1 | 2/2002 | Bosley |

(56) References Cited

U.S. PATENT DOCUMENTS

| | | |
|---|---|---|
| 6,379,518 B1 | 4/2002 | Osawa et al. |
| 6,379,548 B1 | 4/2002 | Kurokawa et al. |
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 9,808,767 B2 | 11/2017 | Tabayashi et al. |
| 2004/0011723 A1* | 1/2004 | Bradford .......... B01D 61/10 210/321.74 |
| 2008/0290031 A1 | 11/2008 | Popa |
| 2013/0334128 A1 | 12/2013 | Takagi et al. |
| 2016/0008763 A1 | 1/2016 | Roderick et al. |
| 2016/0236132 A1 | 8/2016 | Hara et al. |

FOREIGN PATENT DOCUMENTS

| | | |
|---|---|---|
| EP | 2902094 | 8/2015 |
| WO | WO2010047360 A1 | 4/2010 |
| WO | WO2015016253 A1 | 2/2015 |
| WO | WO2002/055179 | 8/2015 |
| WO | WO2016199272 A1 | 12/2016 |
| WO | WO2017087461 A1 | 5/2017 |

* cited by examiner

INTERFERENCE PATTERNS FOR SPIRAL WOUND ELEMENTS

TECHNICAL FIELD

The subject invention relates to a permeable membrane system useful for the separation of fluid components, including spiral-wound membrane permeable membrane elements.

BACKGROUND ART

Spiral-wound membrane filtration elements consist of a laminated structure comprised of a membrane sheet sealed to or around a porous permeate spacer which creates a path for removal of the fluid passing through the membrane to a central tube, while this laminated structure is wrapped spirally around the central tube and spaced from itself with a porous feed spacer to allow axial flow of the fluid through the element. While this feed spacer is necessary to maintain open and uniform axial flow between the laminated structure, it is also a source of flow restriction and pressure drop within the axial flow channel and also presents areas of restriction of flow and contact to the membrane that contribute significantly to membrane fouling via biological growth, scale formation, and particle capture.

Improvements to the design of spiral wound elements have been disclosed by Barger et al and Bradford et al., which replace the feed spacer with islands or protrusions either deposited or embossed directly onto the outside or active surface of the membrane. This configuration is advantageous in that it maintains spacing for axial flow through the element while minimizing obstruction within the flow channel. It also eliminates the porous feed spacer as a separate component, thus simplifying element manufacture. Patent publication number US2016-0008763-A1 entitled Improved Spiral Wound Element Construction teaches the application of printed patterns on the back side of the active surface of the membrane sheet, or directly on the surface of the permeate spacer.

The following references, each of which is incorporated herein by reference, can facilitate understanding of the invention: U.S. Pat. Nos. 3,962,096; 4,476,022; 4,756,835; 4,834,881; 4,855,058; 4,902,417; 4,861,487; 6,632,357; and US application 2016-0008763-A1.

SUMMARY OF INVENTION

Embodiments of the present invention provide a membrane for use in a spiral wound filtration element, comprising a first leaf and a second leaf, where each leaf has an active surface with a plurality of protrusions disposed on the surface, the protrusions being shaped and disposed on the surface such that when the active surface of the first leaf is placed adjacent to the active surface of the second leaf the protrusions are in contact with each other, with the protrusions on the first leaf separated from the active surface of the second leaf by the protrusions on the second leaf; where the first leaf and the second leaf are placed with the active surfaces facing each other and separated by the protrusions. The two leafs can be separate sheets of a suitable material, or can be provided by folding a single sheet, with each side of the fold providing one leaf. Note that a membrane for use in a spiral wound filtration element inherently has two edges, the feed edge and reject edge, corresponding to the edges of the membrane that will encounter feed fluid flow and eject waste fluid flow respectively. Such a membrane also inherently has a width, corresponding to the dimension of the material between the feed and reject edges.

In some embodiments, the protrusions comprise a plurality of line-shaped protrusions, where the line-shaped protrusions are disposed parallel to each other and separated from each other in all planar directions on the surface of the corresponding leaf; and wherein the line-shaped protrusions are disposed on the surface at an angle other than 90 degrees from the feed edge of the corresponding leaf such that the line-shaped protrusions on the first leaf contact the line-shaped protrusions on the second leaf at their intersections. The line-shaped protrusions can extend across the entire width of the leaf, or can extend across less than the entire width. In some embodiments, the angle is between 40 and 85 degrees, or between 100 and 135 degrees. In some embodiments, the protrusions protrude from the surface of each leaf by at least 0.065 mm but not more than 0.4 mm. In some embodiments, the protrusions comprise a plurality of curved features, configured such that the curved feature on the first leaf will intersect the curved features on the second leaf at an angle other than 0 degrees when the membrane is spirally wound. In some embodiments, the line-shaped protrusions are at least 20 mm long in the axial dimension (the component of the length measured parallel to the axis of the center tube when spirally wound) and the spacing between line segments is less than the length of the line segments.

In some embodiments, the protrusions are disposed in a first region of the first leaf, and in a first region of the second leaf, the embodiment further comprises a plurality of flow protrusions disposed (a) on the active surface of the first leaf other than in the first region of the first leaf, (b) on the active surface of the second leaf other than in the first region of the second leaf, or (c) both, wherein the flow protrusions have a height about equal to the sum of the height of the protrusions in the first region of the first leaf and the height of the protrusions in the first region of the second leaf, and wherein flow protrusions on one leaf do not contact those on the other leaf when the element is spiral wound.

In some embodiments, the line-shaped protrusions are disposed in regions proximal the feed and reject edges of the corresponding leaf, and the embodiment further comprises a plurality of flow protrusions disposed (a) on the active surface of the first leaf in regions other than those occupied by the line-shaped protrusions, (b) on the active surface of the second leaf in regions other than those occupied by the line-shaped protrusions, or (c) both, wherein the flow protrusions have a height about equal to the sum of the height of the line-shaped protrusions on the first leaf and the height of the line-shaped protrusions on the second leaf; and wherein the flow protrusions on one leaf do not contact those on the other leaf when the element is spiral wound.

The present invention also provides a method of making a membrane, comprising providing a first leaf and a second leaf, each having an active surface; placing a plurality of protrusions on the active surface of each leaf, the protrusions being shaped and disposed on the surface such that when the active surface of the first leaf is placed adjacent to the active surface of the second leaf the protrusions are in contact with each other with the protrusions on the first leaf separated from the active surface of the second leaf by the protrusions on the second leaf; placing the active surface of the first leaf adjacent to the active surface of the second leaf, separated by the protrusions. Providing a first leaf and a second leaf can comprise providing two separate sheets, or can comprise providing a sheet separated into a first leaf and a second leaf by a fold line.

The present invention also provides a filtration element as those described herein, spirally wound around a center tube. The present invention also provides a fluid treatment system, comprising a plurality of filtration elements as those described herein. The present invention also provides a method of treating a fluid, comprising flowing the fluid through a filtration element as those described herein.

Some embodiments provide a membrane for use in a spiral wound filtration element, comprising a sheet having an active surface, the sheet folded with the active surface inside the folded sheet, wherein the active surface has a plurality of protrusions disposed thereon, the protrusions being shaped and disposed on the surface such that the protrusions contact each other and hold apart the facing active surfaces in the folded sheet. In some embodiments, the protrusions comprise a plurality of line-shaped protrusions disposed on the active surface at an angle other than 90 degrees to the feed edge of the membrane. In some embodiments, the angle is between 40 and 85 degrees, or between 100 and 135 degrees. In some embodiments, the protrusions protrude from the surface of the sheet by at least 0.065 mm but not more than 0.4 mm.

DESCRIPTION OF EMBODIMENTS AND INDUSTRIAL APPLICABILITY

Embossing or depositing features onto the surface of the membrane sheet, or onto or into the permeate carrier sheet of a spiral-wound element to provide spacing between adjacent membrane sheets can provide several advantages as compared to feed spacer mesh including more open flow channels, lower pressure drop, reduced fouling, and the ability to produce thinner feed space than is practical using a mesh. Various configurations have been disclosed by Barger et al, Bradford et al, and in PCT/US2014/018813. Embodiments of the present invention provide the use of printed or otherwise deposited surface features that selectively contact one another to provide spacing between adjacent membrane sheets to create unique contact and flow patterns not achievable by deposition of isolated islands. The patterns created thereby may also contain other deposited features that do not contact one another to provide additional spacing and flow direction within the spiral-wound element. Additionally, variable heights of printed or otherwise deposited features can be employed to produce different spacer geometries on different areas of the spiral-wound element.

Previous disclosures of printing, embossing, or otherwise depositing features to provide feed spacing in spiral-wound elements typically involve deposition of the features on one half of each folded membrane leaf to provide the spacing while eliminating the possibility of having the features contact one another or stack when the leaf is folded. Contact and geometry considerations are made more complex when a spiral-wound element is rolled because of the changing radii of the leaf sections to one another and to the rest of the components of the element. In some cases, however, having spacing elements deposited across all or part of the membrane surface which are designed to contact one another upon folding can be beneficial. Deposition patterns or features can be configured such that when the sheet is folded and rolled, there is no possibility at any point for the patterns to nest within the opposing pattern and feature-to-feature contact is ensured rather than feature-to-membrane contact.

Figure 1:
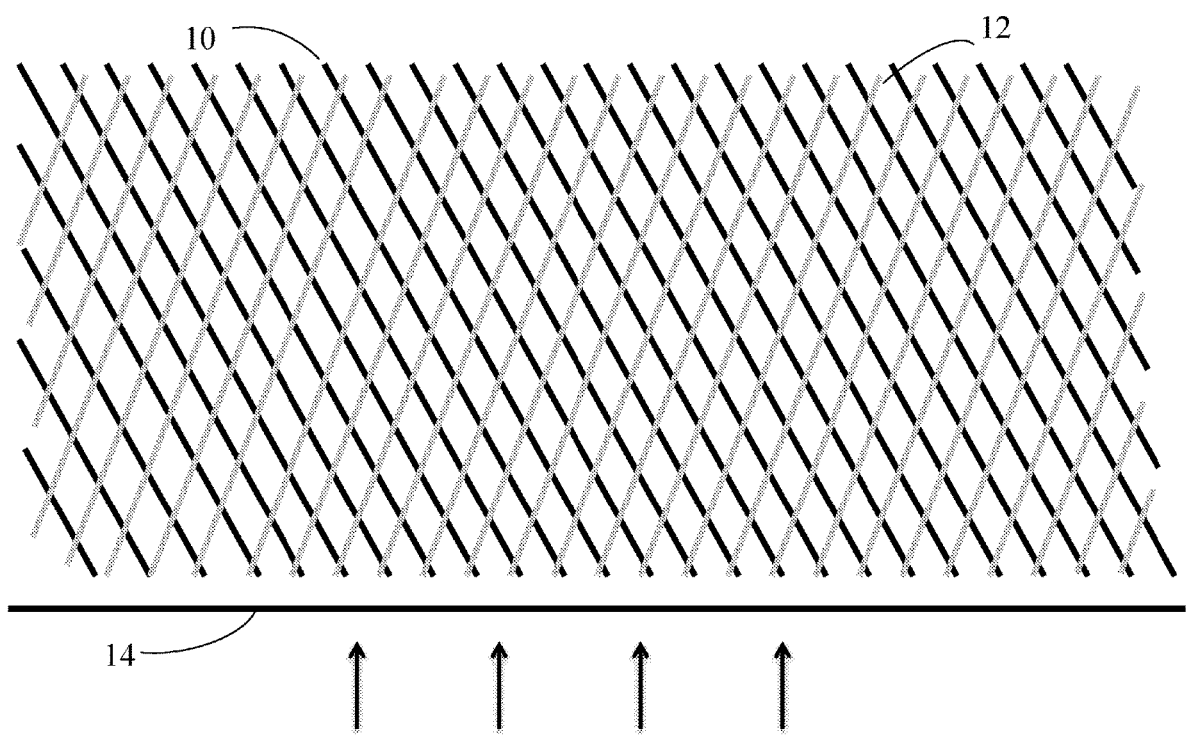
FIG. 1 is an illustration of opposing patterns of solid lines on opposing faces of a single folded membrane leaf.

In an example embodiment shown in FIG. 1, a series of continuous angled parallel lines 10 are deposited on the membrane surface extending from the edge corresponding to the inlet flow of the rolled element to the edge corresponding to the outlet flow. In this example, the printed lines can be between 0.065 mm and 0.80 mm wide and from 0.065 mm to 0.40 mm tall. Spacing between adjacent elements should be close enough to prevent collapse of the membrane sheet between the parallel lines during membrane rolling due to the viscosity of the adhesive used to form the envelope between the membrane sheet, the adjacent permeate carrier and the next membrane sheet. For materials in common use today, this spacing can be no more than 3 mm from one line to the next, and more preferably is 2.5 mm. Any angle between 0° and 90° or between 90° and 180° from the inlet flow edge 14 can be used to ensure feature to feature contact on the folded leaf, but angles in the ranges from 45-80° or 100-135° can be more suitable to maintain acceptable flow and pressure drop through the element. When folded, the deposited patterns 10 will contact the opposite pattern 12 at a supplementary angle such that the deposited patterns will repeatedly cross and support each other without letting the pattern from the opposite side contact the membrane film directly. The lines can be straight lines as shown, and can also be curved, sinusoidal, or otherwise shaped provided they contain no extended segments (e.g. <10 mm) where the pattern is near 90°. Patterns that are not straight lines can be chosen for particular performance characteristics, e.g., to improve mixing or to lengthen or shorten the flow path across the membrane surface.

Figure 2:
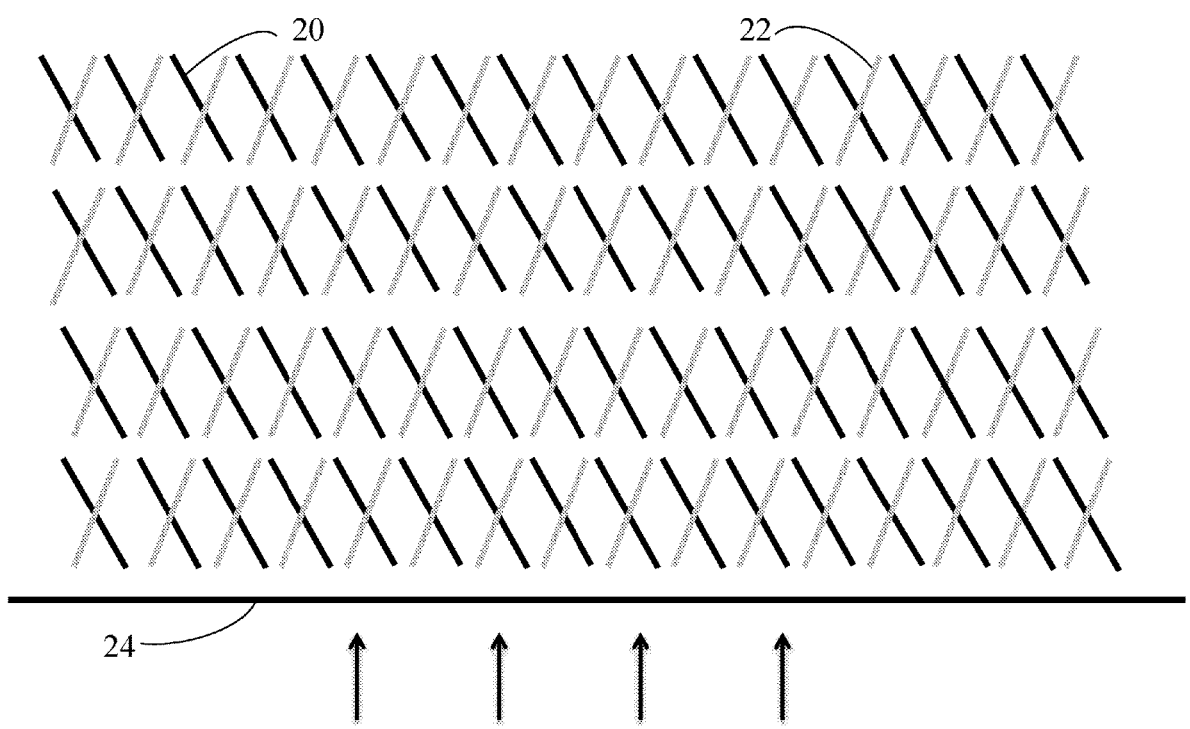
FIG. 2 is an illustration of opposing patterns of segmented lines on opposing faces of a single folded membrane leaf.

In another example embodiment shown in FIG. 2, line segments 20 can be used instead of continuous lines to produce the pattern that will contact itself 22 when folded. In this example, the printed pattern can be between 0.065 mm and 0.80 mm wide and from 0.065 mm to 0.40 mm tall. Spacing between adjacent elements should be close enough to prevent collapse of the membrane sheet between the parallel lines during membrane rolling due to the viscosity of the adhesive used to form the envelope between the membrane sheet, the adjacent permeate carrier and the next membrane sheet. With materials in common use today, this spacing can be no more than 3 mm from one line to the next, and more preferably is 2.5 mm. Any angle between 0° and 90° or between 90° and 180° from the inlet flow edge 24 can be used to ensure feature to feature contact on the folded leaf, but angles in the ranges from 45-80° or 100-135° can be more suitable to maintain acceptable flow and pressure drop through the element. Rolling of a spiral-wound element, even when done in an automated fashion, is still inexact. Typically folded leaves within a given element are able to move as much as +/−10 mm axially to the center tube of the element due to movement of the various sheet materials and glue used in assembly. As such, minimum feature length of beyond 20 mm in the axial dimension will generally be needed to ensure contact between adjacent features in folded leaves. Gaps between adjacent line segments in the axial dimension are shorter than the feature length in the axial dimension to avoid any possibility of nesting of features when folded. In this embodiment the line segments can also be straight, curved, sinusoidal, or otherwise repetitively varying.

Figure 3:
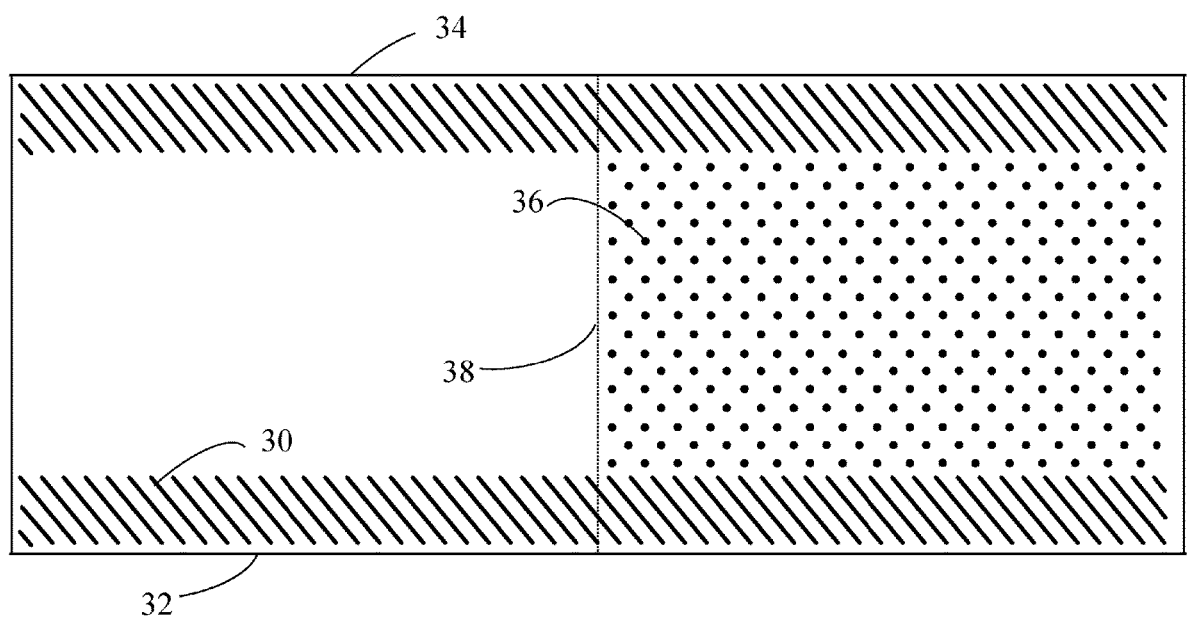
FIG. 3 is an illustration of a membrane leaf with half-height edge patterns deposited along the full length of the inlet and outlet edges of the leaf and full height features deposited on one half of the membrane leaf.

Maintaining open spacing at the inlet and outlet edges of the element while minimizing flow restriction within the flow channel can also be enhanced by combining full leaf length deposition where features meet to support each other when folded with areas of feature deposition that are not designed to interfere with adjacent features after folding. This allows the patterns that are not designed to interfere with adjacent features after folding to comprise a variety of shapes that are not limited to lines or line segments, such as circular or polygonal posts, curved line segments or other shapes that alter flow in a desirable manner. In an example shown in FIG. 3, the printed interference pattern 30 along the inlet 32 and outlet 34 edges can be between 0.065 mm and 0.80 mm wide and from 0.065 mm to 0.40 mm tall, and extend from 40 mm to 80 mm axially from the inlet and outlet edge of the membrane leaf. Any angle between 0° and 90° or between 90° and 180° from the inlet and outlet flow edge can be used to ensure feature to feature contact on the folded leaf, but angles in the ranges from 45-80° or 100-135° can be more suitable to maintain acceptable flow and pressure drop through the element. Another pattern is deposited in the center section 30 on half of the membrane leaf and can be twice as tall as the features on the edges so that, when the leaf is folded along its center line 38, the spacing on the edges and the central area is uniform. In general the patterns deposited at the edge are spaced more densely to support the glue line used to bond the leaves together while the central pattern are spaced more sparsely to allow less restricted flow through this portion of the element.

In a specific example embodiment a pattern of solid line segments 30, 0.6 mm wide and 93 mm long, is deposited extending from the inlet 32 and outlet 34 edge, at an angle of 45° relative to the edge of the membrane sheet such that it extends 66 mm inward onto the leaf at a height that is one half the desired finished feed space height, in this case 0.2 mm for a 0.4 mm total feed spacing after folding. Another pattern, a square array of circular posts 36, 1.2 mm in diameter spaced 6.5 mm from one another, is then deposited on the central area between the two 0.2 mm patterns to a height of 0.4 mm. This pattern is only deposited along one-half the length of the overall leaf such that when the leaf is folded in half at the center line 38, the edge patterns contact one another to create 0.4 mm feed space at the edges while the central pattern creates the 0.4 mm spacing in the middle of the leaf.

Figure 4:
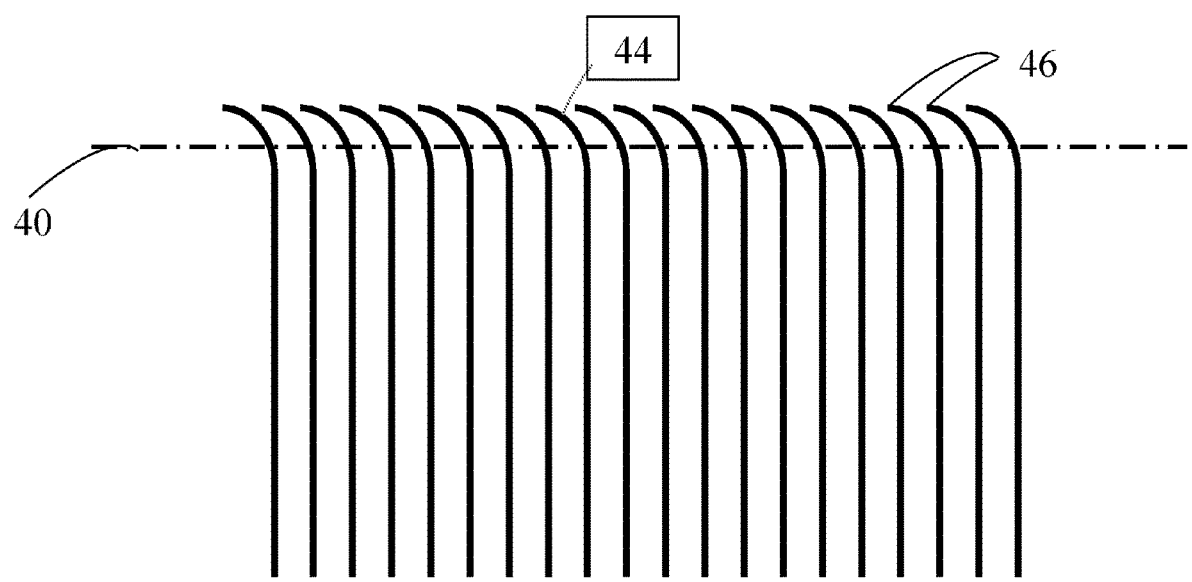
FIG. 4 is a representation of membrane feed spacers that have curved lead in features on the feed end of the membrane element and that are trimmed after rolling the element.
Figure 5:
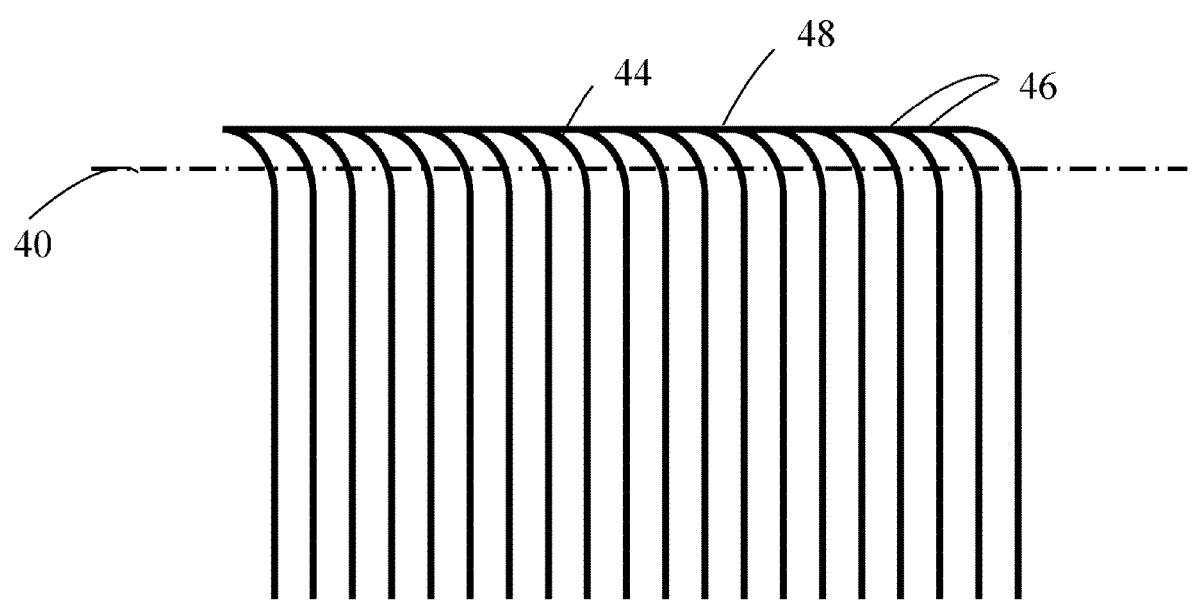
FIG. 5 is a representation of membrane feed spacers that have curved lead in features on the feed end of the membrane element and curved anti-telescoping device features to help avoid end blocking of the element from high solids fluids.
Figure 6:
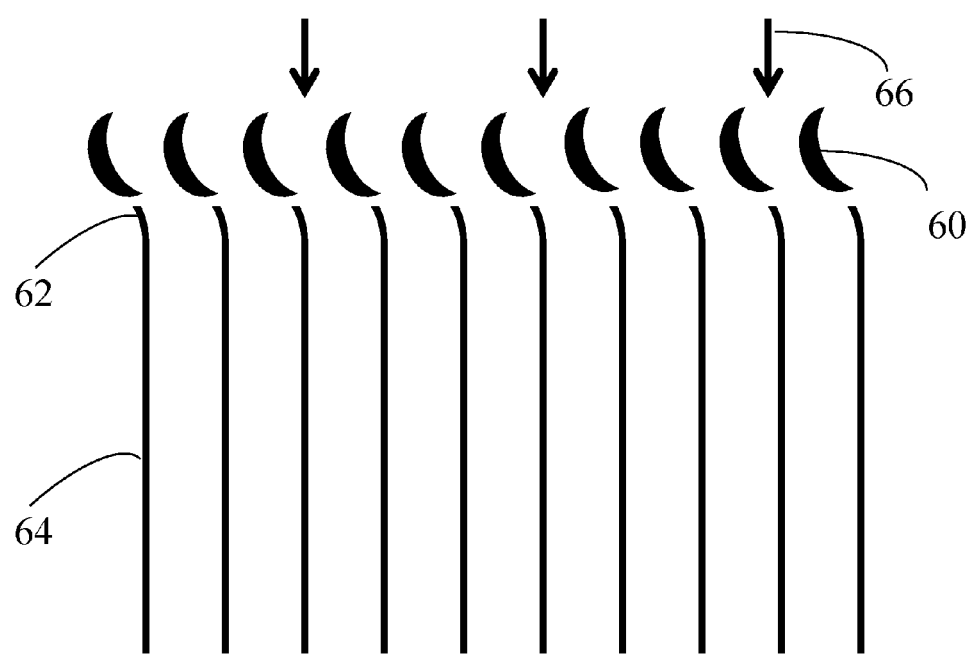
FIG. 6 is a view of a flat, un-rolled spiral wound element with turning vanes having curved surfaces.

In another embodiment of the present invention shown in FIG. 4, curved inlet brine feed spacer features can be utilized. These features can be printed or deposited on one half of the membrane leaf along the inlet and outlet edges and only extend far enough to provide support to the area of the glue line. During rolling and gluing the element, the curved features 44 at the inlet and outlet edge create a tighter pattern where the tips 46 approach one another such that during rolling the patterns provide support to the adjacent layer as the spiral wound element is rolled. In another embodiment of the present invention shown in FIG. 5, the space between tips 46 can be reduced to zero thereby making a continuous solid line 48 that provides more complete support of the glue line during rolling operations. After the ends of the element are trimmed at trim line 40, the tighter spacing of the curved portions is removed which opens up the inlet and outlet spacing between the features to facilitate fluid flow and help avoid pressure losses at the ends of the element. In conventional spiral wound membranes, the flow of fluid into the brine feed spaces is normal (flow vector is parallel to the axis of the center tube) to the end of the element, and materials in the fluid stream can stack up at the end of the brine feed channels and thereby block the fluid feed channels. This fluid blockage at the feed end of the element can be mitigated by creating a fluid flow stream that is partially diverted in a flow vector that is at an angle from the centerline of the element. By creating a sweeping motion of fluid as it enters the brine feed spaces, materials that might have accumulated at the feed spaces can be swept away. In FIG. 6, turning vanes 60 have curved surfaces that impart a lateral flow at the end of the rolled element to help avoid end blocking of the element by sweeping solids in the fluid stream from the end face of the spiral wound element that can be entering the brine feed space channels of the spiral wound element. The view of FIG. 6 is shown as a flat, un-rolled view of a spiral wound element. Normally, this pattern is wrapped around a center tube, but is shown in FIG. 6 to more easily describe the concept. Brine feed solution 66 is normal (parallel to the axis of the center tube) as it enters the end of the spiral wound element. Turning vanes 60 impart a flow pattern that is across the end of the spiral wound element thereby keeping material from accumulating on the end of the brine feed channel. As the printed spacers 64 enter the element, there is a curved inlet component 62 that maintains the brine feed solution 66 in line with the flow vector of brine feed solution 66. As brine feed solution enters the membrane feed space, printed spacers 64 help align the flow vector of brine feed solution 66 to be more parallel to the center line of the membrane element center tube. However, it will be known to those familiar with the prior art that these printed spacers 64 can have various shapes and configurations to stimulate localized vorticity and reduce concentration polarization in the brine feed spaces of the spiral wound element.

The features can be deposited by a variety of techniques. Traditional printing techniques such as offset printing, gravure printing, and screen printing, can be suitable, although there might be thickness and geometry limitations with these deposition techniques. Thicker features can be deposited by microdispensing, inkjet printing, fused deposition, photo polymer technology, hot melt polymers, or via application using an adhesive that can include roll transfer of sheet or pick-and-place of individual features.

The features can be comprised of any number of materials which are compatible with the separated fluid and the permeate carrier including, but not limited to, thermoplastics, reactive polymers, waxes, or resins. Additionally, materials that are compatible with the separated fluid but not compatible with direct deposition to the membrane sheet, including, but not limited to high-temperature thermoplastics, metals, or ceramics, can be pre-formed, cast, or cut to the proper dimensions and adhered to the surface of the membrane sheet with an adhesive that is compatible with the membrane sheet.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

We claim:

1. A membrane for use in a spiral wound filtration element, comprising a sheet having an active surface, the sheet folded with the active surface inside the folded sheet, wherein the active surface has a plurality of protrusions disposed thereon, the protrusions being shaped and disposed on the surface such that the protrusions contact each other at their intersections and hold apart the facing active surfaces in the folded sheet.

2. A membrane as in claim 1, wherein the protrusions comprise a plurality of line-shaped protrusions disposed on the active surface at an angle other than 90 degrees to the feed edge of the membrane.

3. A membrane as in claim 2, wherein the angle is between 40 and 85 degrees, or between 100 and 135 degrees.

4. A membrane as in claim 2, wherein the protrusions protrude from the surface of each leaf by at least 0.065 mm but not more than 0.4 mm.

\* \* \* \* \*